United States Patent
Chang et al.

(10) Patent No.: US 9,064,183 B2
(45) Date of Patent: Jun. 23, 2015

(54) COMPUTING DEVICE AND METHOD FOR IDENTIFYING BORDER LINES OF ELEMENTS ON IMAGES OF OBJECTS

(71) Applicants: Chih-Kuang Chang, New Taipei (TW); Li Jiang, Shenzhen (CN); Zhong-Kui Yuan, Shenzhen (CN); Zhi-Jun Zou, Shenzhen (CN)

(72) Inventors: Chih-Kuang Chang, New Taipei (TW); Li Jiang, Shenzhen (CN); Zhong-Kui Yuan, Shenzhen (CN); Zhi-Jun Zou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 174 days.

(21) Appl. No.: 13/682,759

(22) Filed: Nov. 21, 2012

(65) Prior Publication Data
US 2013/0195366 A1    Aug. 1, 2013

(30) Foreign Application Priority Data
Jan. 30, 2012   (CN) .......................... 2012 1 0020896

(51) Int. Cl.
*G06K 9/48*    (2006.01)
*G06K 9/00*    (2006.01)

(52) U.S. Cl.
CPC .............. *G06K 9/48* (2013.01); *G06K 9/00973* (2013.01)

(58) Field of Classification Search
CPC .............................. G06K 9/48; G06K 9/00973
USPC .................................. 382/199, 201, 266, 286
See application file for complete search history.

(56) References Cited

U.S. PATENT DOCUMENTS

| | | | | |
|---|---|---|---|---|
| 6,244,764 | B1 * | 6/2001 | Lei et al. ........................ | 400/103 |
| 6,401,028 | B1 * | 6/2002 | Kamiya et al. ................ | 701/441 |
| 6,760,483 | B1 * | 7/2004 | Elichai et al. ................. | 382/241 |
| 7,716,639 | B2 * | 5/2010 | Dahlin et al. ................. | 717/121 |
| 8,121,416 | B2 * | 2/2012 | Chang et al. .................. | 382/201 |
| 2003/0103673 | A1 * | 6/2003 | Rathod et al. ................. | 382/199 |
| 2013/0195366 | A1 * | 8/2013 | Chang et al. .................. | 382/199 |
| 2013/0223761 | A1 * | 8/2013 | Chang et al. .................. | 382/286 |

* cited by examiner

*Primary Examiner* — Gregory M Desire
(74) *Attorney, Agent, or Firm* — Novak Druce Connolly Bove + Quigg LLP

(57) ABSTRACT

In a method for identifying border lines of elements on an image of an object using a computing device, a Dynamic Link Library (DLL) name and one or more measuring parameters are received from the computing device. A DLL is obtained according to the received DLL name. Measuring functions of the obtained DLL are provided for selection. A constructed function of the DLL is obtained according to the number and types of the received measuring parameters to transmit the received measuring parameters to a selected measuring function. Coordinates of points on the image are computed according to the received measuring parameters using the selected measuring function, and a border line of an element on the image is fitted according to the coordinates of the points.

12 Claims, 3 Drawing Sheets

COMPUTING DEVICE AND METHOD FOR IDENTIFYING BORDER LINES OF ELEMENTS ON IMAGES OF OBJECTS

BACKGROUND

1. Technical Field

Embodiments of the present disclosure relate to image measuring technique, and more particularly to a computing device and a method for identifying border lines of elements on an image captured from a measured object.

2. Description of Related Art

Image measuring techniques are widely used in precision measurement field for precisely and speedily measuring elements, such as, points, lines, planes, and circles, on an image of an object. The measurements of the elements include measuring coordinates of the points, measuring line widths of the lines, and measuring circular degrees of the circle, for example.

When measuring the elements using an image measuring software, the image measuring software identifies border lines of the elements, fits the elements according to the border lines, and then measures the fitted elements. If border lines of the elements on the image are unclear, the image measuring software cannot identify the border lines of the elements on the image, there is thus a failure to fit and measure the elements.

DETAILED DESCRIPTION

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
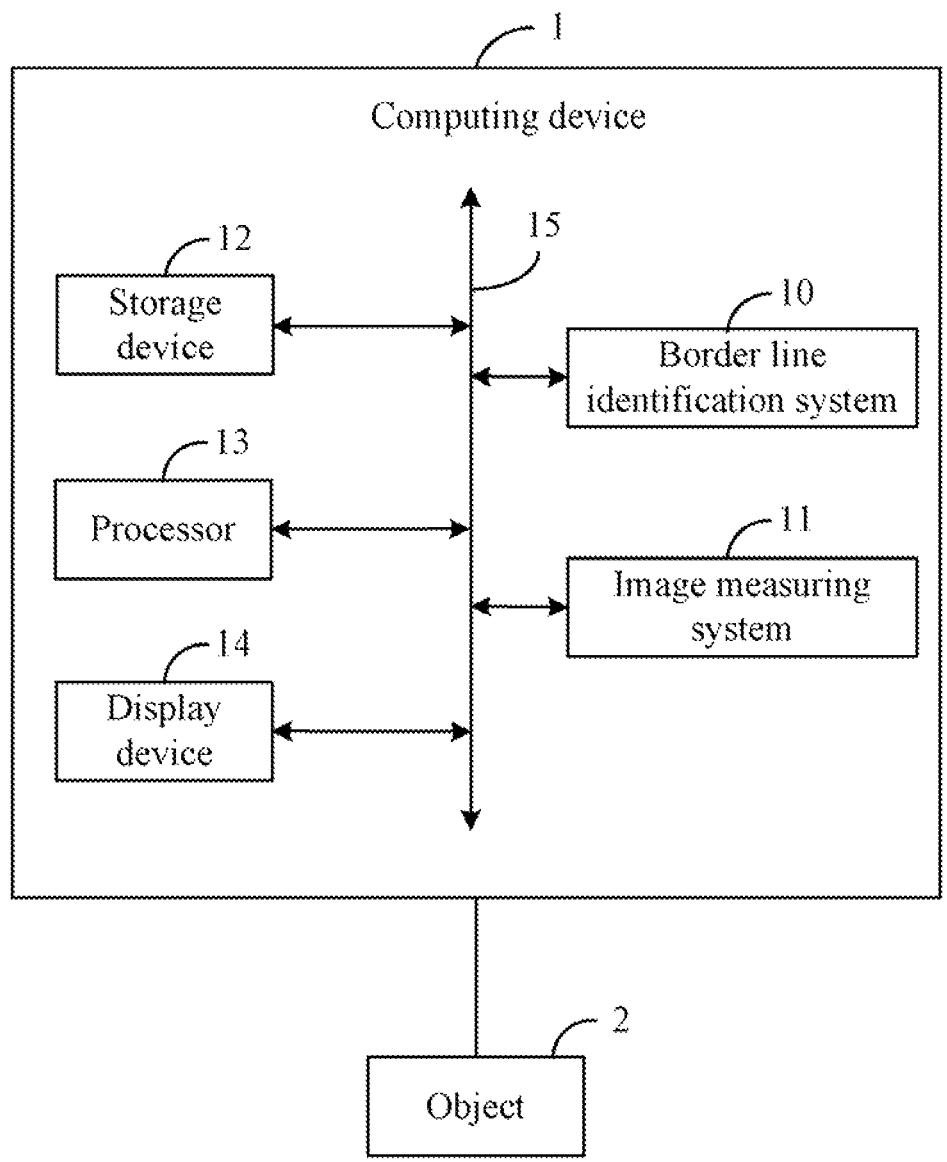
FIG. 1 is a block diagram of one embodiment of a computing device including a border line identification system.

FIG. 1 is a block diagram of one embodiment of a computing device 1 including a border line identification system 10. The computing device 1 may be a desktop computer, a server, or a personal digital assistant (PDA), for example. The computing device 1 further includes an image measuring system 11, a storage device 12, a processor 13, a display device 14, and a bus 15. One skilled in the art knows that the computing device 1 may be configured in a number of other ways and may include other or differently-arranged components.

The image measuring system 11 include computerized codes in the form of one or more programs, which are stored in the storage device 12. The image measuring system 11 has functions of obtaining an image of an object 2, transmitting the image to the border line identification system 10, and displaying the image on the display device 14.

The border line identification system 10 also includes computerized codes in the form of one or more programs, which are stored in the storage device 12. In present embodiment, the one or more programs of the border line identification system 10 are described in the form of function modules (see FIG. 2), which have functions of identifying border lines of elements on the image of the object 2.

The storage device 12 may include some type(s) of non-transitory computer-readable storage mediums, such as a memory, a hard disk drive, a compact disc, a digital video disc, or a tape drive.

As mentioned above, the storage device 12 stores the computerized codes of the image measuring system 10 and the border line identification system 11. The storage device 12 also stores images of the object 2 and one or more Dynamic Link Libraries (DLLs). In the present embodiment, each of the one or more DLLs have the same DLL name, namespace name, and public class name. For example, if a DLL is named as "MeasureTest.dll", then the namespace of the DLL is named as "namespace MeasureTest" and the public class of the DLL is named as "public class MeasureTest".

Each of the one or more DLLs has a function of measuring, such as identifying border lines of elements on the image of the object 2. The elements on the image of the object may include types of point, line, plane, and circle, for example. Each of the one or more DLLs includes one or more measuring functions each of which is used to measure one type of element.

In addition, each of the one or more DLLs includes one or more constructed functions which are used to transmit received measuring parameters to a measuring function corresponding to the constructed functions. Each of the one or more constructed functions indicates a number and type of the received measuring parameters that need to be transmitted to the measuring function.

One example of a first constructed function corresponding to a measuring function that is used to measure points is described as follows:

```
public MeasureTest(Bitmap Map, Point SP, Point EP, bool First, int Size)
{
......
}.
```

Using this constructed parameter, five measuring parameters can be transmitted to the measuring function for measuring points. The five measuring parameters include a first parameter "Map" having a type of bitmap, a second parameter "SP" having a type of point, a third parameter "EP" also having a type of point, a fourth parameter "First" having a type of Boolean logic, and a fifth parameter "Size" having a type of integer.

One example of a second constructed function corresponding to a measuring function that is used to measure lines is described as follows:

```
public MeasureTest(Bitmap Map, Point SP, Point EP, bool First,
   int Size, int Interval, int Width, double FilterDis)
   {
   ......
   }
```

Using this constructed parameter, eight measuring parameters can be transmitted to the measuring function that is used to measure lines. The eight measuring parameters include a first parameter "Map" having a type of bitmap, a second parameter "SP" having a type of point, a third parameter "EP" also having a type of point, a fourth parameter "First" having a type of Boolean logic, a fifth parameter "Size" having a type of integer, a sixth parameter "Interval" also having a type of integer, a seventh parameter "Width" also having a type of integer, and an eighth parameter "FilterDis" having a type of double float.

The processor 13 may be a microprocessor, an application-specific integrated circuit (ASIC), and a field programmable gate array (FPGA), for example. The processor 13 may execute the computerized codes of the image measuring system 11 and the border line identification system 10 to perform the respective functions.

The bus 15 permits communication among the components, such as between the border line identification system 10, the image measuring system 11, the storage device 12, the processor 13, and the display device 14.

Figure 2:
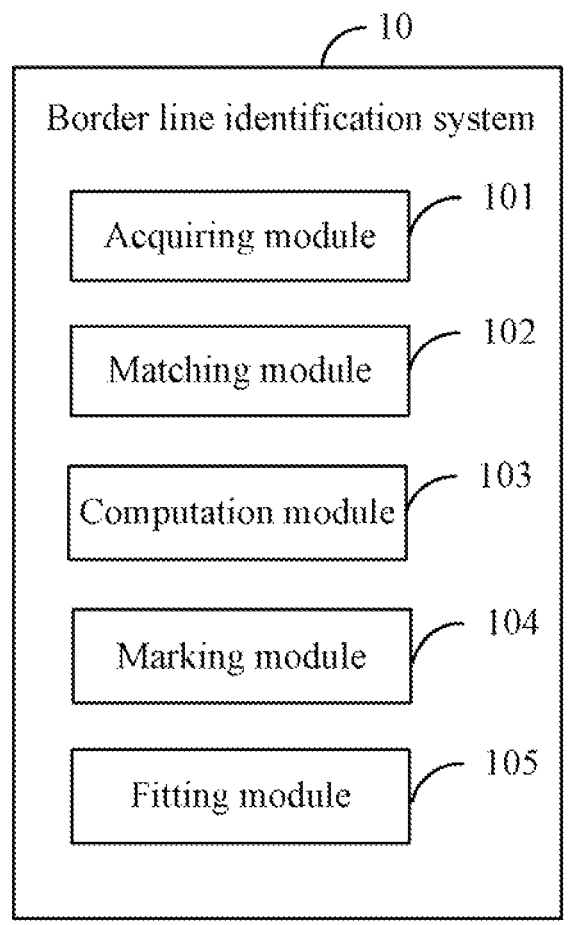
FIG. 2 is a block diagram of one embodiment of function modules of the border line identification system in FIG. 1.

FIG. 2 is a block diagram of one embodiment of function modules of the border line identification system 10 in FIG. 1. In one embodiment, the border line identification system 10 may include an acquiring module 101, a matching module 102, a computation module 103, a marking module 104, and a fitting module 105. The function modules 101-105 provide at least the functions needed to execute the steps illustrated in FIG. 3.

Figure 3:
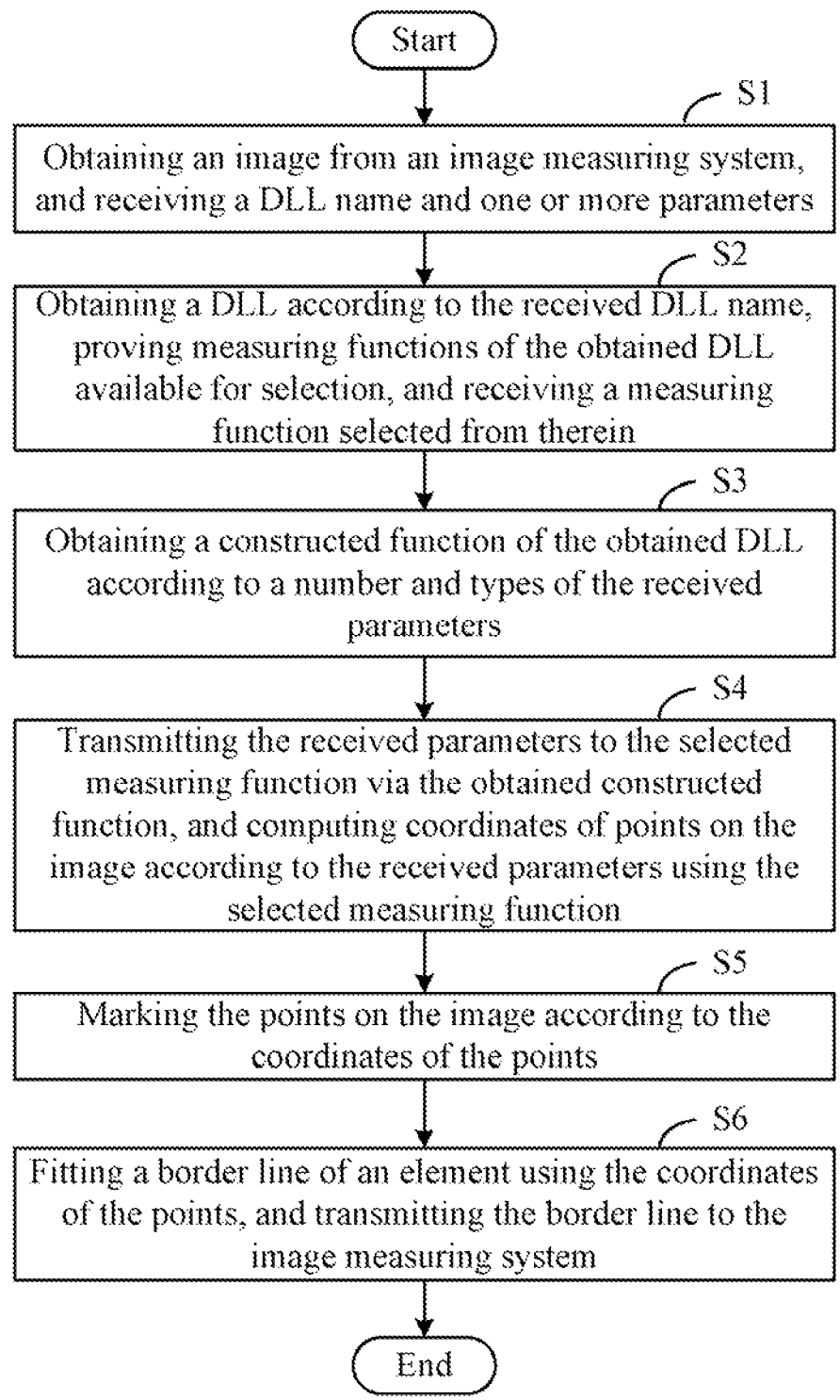
FIG. 3 illustrates a flowchart of one embodiment of a method for identifying border lines of elements on an image of an object.

FIG. 3 illustrates a flowchart of one embodiment of a method for identifying border lines of elements on images of the objects using the computing device 1 of FIG. 1. Depending on the embodiment, additional steps may be added, others removed, and the ordering of the steps may be changed.

In step S1, the acquiring module 101 obtains an image of the object 2 from the image measuring system 11, and receives a DLL name and one or more measuring parameters input by a user. The received measuring parameters can be a name of the image, a line width of a line, a start point of the line, an end point of the line, and a point interval, for example.

In step S2, the acquiring module 101 obtains a DLL from the storage device 12 according to the received DLL name, provides a group of measuring functions of the obtained DLL available for selection, and receives a measuring function selected by the user. As mentioned above, the measuring functions of the DLL can measure different types of elements. The user can select one measuring function which can measure a desired type of element. For example, the user can select the measuring function which measures lines.

In step S3, the matching module 102 obtains a constructed function of the DLL according to the number and types of the received measuring parameters. For example, if the received parameter includes five measuring parameters, and the types of the five measuring parameters are bitmap type, one type of point type, another type of point type, Boolean logic type, and integer type, then, the matching module 102 obtains the first constructed function as illustrated in the above example.

In step S4, the computation module 103 transmits the received measuring parameters to the selected measuring function via the obtained constructed function, and computes coordinates of points on the image according to the received measuring parameters using the selected measuring function.

In step S5, the marking module 104 marks the points on the image according to the coordinates, for viewing by the user.

In step S6, the fitting module 105 fits all the marked points to identify a border line of an element according to the coordinates, and transmits the border line to the image measuring system 11.

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computerized method of identifying border lines of elements on an image of an object, the method being executed by at least one processor of a computing device, the method comprising:
    obtaining the image of the object, and receiving a Dynamic Link Library (DLL) name and one or more measuring parameters inputted by a user;
    obtaining a DLL from a storage device of the computing device according to the received DLL name, providing a group of measuring functions of the obtained DLL available for selection, and receiving a measuring function selected from the measuring functions;
    obtaining a constructed function of the DLL according to a number and types of the received measuring parameters, and transmitting the received measuring parameters to the selected measuring function via the obtained constructed function, the constructed function indicating a number and a type of the received measuring parameters that need to be transmitted to the measuring function;
    computing coordinates of points on the image according to the received measuring parameters using the selected measuring function; and
    fitting a border line of an element on the image according to the coordinates of the points.

2. The method according to claim 1, wherein the DLL name is same as a namespace name and a public class name of the DLL.

3. The method according to claim 1, wherein the method further comprises:
    marking the points on the image according to the coordinates of the points for viewing by the user.

4. The method according to claim 1, wherein the method further comprises:
    transmitting the border line of the element to an image measuring system for measuring the element.

5. An computing device, comprising:
    a storage device stores one or more DLLs;
    at least one processor; and
    one or more modules that are stored in the storage device and are executed by the at least one processor, the one or more modules comprising instructions to:
    obtain an image of an object, and receive a Dynamic Link Library (DLL) name and one or more measuring parameters inputted by a user;
    obtain a DLL from the storage device according to the received DLL name, provide a group of measuring functions of the obtained DLL available for selection, and receive a measuring function selected from the measuring functions;
    obtain a constructed function of the DLL according to a number and types of the received measuring parameters, and transmit the received measuring parameters to the selected measuring function via the obtained constructed function, wherein the constructed function indicates a number and type of the received measuring parameters that need to be transmitted to the measuring function;

compute coordinates of points on the image according to the received measuring parameters using the selected measuring function; and fit a border line of an element on the image according to the coordinates of the points.

6. The computing device according to claim 5, wherein the DLL name is same as a namespace name and a public class name of each of the DLLs.

7. The computing device according to claim 5, wherein the one or more modules further comprises instructions to:

mark the points on the image according to the coordinates of the points for viewing by the user.

8. The computing device according to claim 5, wherein the one or more modules further comprises instructions to:

transmit the border line of the element to an image measuring system for measuring the element.

9. A non-transitory storage medium having stored thereon instructions that, when executed by a processor of a computing device, causes the processor to perform a method for identifying border lines of elements on an image of an object, wherein the method comprises:

obtaining the image of the object, and receiving a Dynamic Link Library (DLL) name and one or more measuring parameters inputted by a user;

obtaining a DLL from a storage unit of the computing device according to the received DLL name, providing a group of measuring functions of the obtained DLL available for selection, and receiving a measuring function selected from the measuring functions;

obtaining a constructed function of the DLL according to a number and types of the received measuring parameters, and transmitting the received measuring parameters to the selected measuring function via the obtained constructed function, the constructed function indicating a number and a type of the received measuring parameters that need to be transmitted to the measuring function;

computing coordinates of points on the image according to the received measuring parameters using the selected measuring function; and fitting a border line of an element on the image according to the coordinates of the points.

10. The non-transitory storage medium according to claim 9, wherein the DLL name is same as a namespace name, and a public class name of the DLL.

11. The non-transitory storage medium according to claim 9, wherein the method further comprises:

marking the points on the image according to the coordinates of the points for viewing by the user.

12. The non-transitory storage medium according to claim 9, wherein the method further comprises:

transmitting the border line of the element to an image measuring system for measuring the element.

* * * * *